(12) United States Patent
Denton et al.

(10) Patent No.: US 10,917,288 B2
(45) Date of Patent: Feb. 9, 2021

(54) ADAPTIVE EDGE-SHIFT FOR ENTERPRISE CONTINGENCY OPERATIONS

(71) Applicant: Bank of America Corporation, Charlotte, NC (US)

(72) Inventors: Sean Denton, Rock Hill, SC (US); Monika Kapur, Jacksonville, FL (US); Stephen T. Shannon, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 17 days.

(21) Appl. No.: 16/451,258

(22) Filed: Jun. 25, 2019

(65) Prior Publication Data

US 2020/0412602 A1 Dec. 31, 2020

(51) Int. Cl.
| | | |
|---|---|---|
| *G06F 15/173* | (2006.01) | |
| *H04L 12/24* | (2006.01) | |
| *H04L 12/26* | (2006.01) | |
| *H04L 29/08* | (2006.01) | |

(52) U.S. Cl.
CPC ...... *H04L 41/0672* (2013.01); *H04L 41/0893* (2013.01); *H04L 43/0817* (2013.01); *H04L 67/1034* (2013.01)

(58) Field of Classification Search
CPC ............. H04L 41/0672; H04L 41/0893; H04L 43/0817; H04L 67/1034
USPC ........................................................ 709/224
See application file for complete search history.

(56) References Cited

U.S. PATENT DOCUMENTS

| | | | | |
|---|---|---|---|---|
| 6,549,880 B1 * | 4/2003 | Willoughby | .............. | H02J 3/00 703/13 |
| 6,629,266 B1 * | 9/2003 | Harper | ................ | G06F 11/1438 714/38.1 |
| 6,983,395 B2 * | 1/2006 | Chen | ...................... | H04M 15/00 714/15 |
| 7,039,829 B2 * | 5/2006 | Duncan | ............... | G06F 11/2069 714/6.23 |
| 7,107,483 B2 * | 9/2006 | Duncan | ............... | G06F 11/2025 711/152 |
| 7,231,559 B2 * | 6/2007 | Dacosta | ................ | H04L 1/0003 714/708 |

(Continued)

OTHER PUBLICATIONS

Mary Shacklett, "Edge Computing: A Cheat Sheet," https://www.techrepublic.com/article/edge-computing-the-smart-persons-guide/, Jul. 21, 2017.

(Continued)

*Primary Examiner* — Melvin H Pollack
(74) *Attorney, Agent, or Firm* — Weiss & Arons LLP; Michael A. Spring, Esq.

(57) ABSTRACT

Apparatus and methods for maintaining service during a communication network outage. The apparatus may include an outage monitor. The outage monitor may monitor conditions that may affect the performance or integrity of a WAN. The apparatus may include a digital switch that may be configured to switch, responsive to a state variable in the monitor, between: a regular-operations information machine at an edge location; and a contingency server disposed at the edge location. When the switch engages the contingency server, data on the contingency server may be available to one or more of banking associates, call center attendants, customers and other suitable enterprise personnel and systems.

18 Claims, 12 Drawing Sheets

(56) References Cited

U.S. PATENT DOCUMENTS

| | | | |
|---|---|---|---|
| 7,289,964 B1* | 10/2007 | Bowman-Amuah | G06F 9/5038 705/1.1 |
| 7,603,259 B2* | 10/2009 | Jrad | G06Q 10/00 703/2 |
| 7,809,595 B2* | 10/2010 | Breslin | G06Q 10/0635 705/7.28 |
| 7,853,417 B2* | 12/2010 | Vaswani | H04Q 9/00 702/60 |
| 7,917,624 B2* | 3/2011 | Gidwani | H04W 84/00 709/226 |
| 7,933,247 B2* | 4/2011 | Gidwani | H04W 84/00 370/332 |
| 7,965,195 B2* | 6/2011 | Deaver, Sr. | H02J 13/00024 340/660 |
| 8,200,527 B1* | 6/2012 | Thompson | G06Q 10/06398 705/7.39 |
| 8,239,070 B1* | 8/2012 | Schlueter | H02J 3/00 700/286 |
| 8,243,596 B2 | 8/2012 | Fedders et al. | |
| 8,244,874 B1 | 8/2012 | Thireault | |
| 8,374,899 B1* | 2/2013 | Heuler | G06Q 10/0635 705/7.11 |
| 8,706,914 B2* | 4/2014 | Duchesneau | F28F 1/00 709/250 |
| 8,856,807 B1* | 10/2014 | Khapre | G06Q 10/10 719/318 |
| 9,087,005 B2* | 7/2015 | Chen | G06F 11/1469 |
| 9,172,646 B2* | 10/2015 | Cardona | H04L 43/0888 |
| 9,395,707 B2* | 7/2016 | Anderson | G06F 30/20 |
| 9,804,928 B2* | 10/2017 | Davis | G06F 3/0613 |
| 9,852,150 B2* | 12/2017 | Sharpe | G06F 3/0641 |
| 9,900,725 B2 | 2/2018 | Young et al. | |
| 9,948,521 B2* | 4/2018 | Doraiswamy | H04L 41/0681 |
| 9,960,980 B2* | 5/2018 | Wilson | H05B 47/19 |
| 10,152,390 B1* | 12/2018 | Chepel | G06F 11/1464 |
| 10,164,858 B2* | 12/2018 | Gunasekara | H04L 43/10 |
| 10,198,322 B2* | 2/2019 | Manjunath | G06Q 10/00 |
| 10,262,147 B2* | 4/2019 | Chen | G06F 21/608 |
| 10,263,836 B2* | 4/2019 | Jain | H04L 41/0672 |
| 10,404,829 B2* | 9/2019 | Natarajan | H04L 65/80 |
| 10,409,697 B2* | 9/2019 | Chen | G06F 11/2094 |
| 10,474,694 B2* | 11/2019 | Bourbonnais | G06F 16/275 |
| 10,498,744 B2* | 12/2019 | Hunt | H04L 12/4625 |
| 10,514,989 B1* | 12/2019 | Borodin | G06F 11/1469 |
| 10,530,652 B2* | 1/2020 | Ayyagari | H04L 41/0873 |
| 10,545,837 B2* | 1/2020 | Cors | G06F 11/1484 |
| 10,601,701 B2* | 3/2020 | Wackerly | H04W 24/08 |
| 10,606,583 B2* | 3/2020 | Benedetti | G06F 8/658 |
| 10,666,494 B2* | 5/2020 | Zafer | H04L 41/0631 |
| 10,666,497 B2* | 5/2020 | Tahhan | H04L 43/0811 |
| 10,805,382 B2* | 10/2020 | Narayanam | H04L 41/0672 |
| 2005/0044150 A1* | 2/2005 | Kaminsky | H04L 51/30 709/206 |
| 2016/0080248 A1* | 3/2016 | Rijnders | H04L 41/5009 709/224 |
| 2016/0098794 A1* | 4/2016 | Mokhtari | G06Q 40/04 705/37 |
| 2017/0235647 A1* | 8/2017 | Kilaru | G06F 11/1464 707/652 |
| 2017/0244593 A1* | 8/2017 | Rangasamy | H04L 67/1097 |
| 2018/0121891 A1 | 5/2018 | Hosny et al. | |
| 2018/0167445 A1 | 6/2018 | Speight et al. | |
| 2018/0367314 A1 | 12/2018 | Egner et al. | |
| 2019/0026450 A1 | 1/2019 | Egner et al. | |
| 2019/0098113 A1* | 3/2019 | Park | G06F 16/9024 |
| 2019/0121960 A1* | 4/2019 | Brown | H04L 41/0893 |
| 2019/0130719 A1* | 5/2019 | D'Amico | G06F 9/44 |
| 2019/0149977 A1* | 5/2019 | Seenappa | H04L 41/0654 370/331 |
| 2019/0166037 A1* | 5/2019 | Shaikh | H03M 13/3761 |
| 2020/0106691 A1* | 4/2020 | Koshelev | G06F 9/4881 |
| 2020/0162355 A1* | 5/2020 | Zacks | H04L 43/10 |
| 2020/0252415 A1* | 8/2020 | Hamdi | G06F 11/3055 |
| 2020/0278901 A1* | 9/2020 | Singh | G06N 5/048 |

OTHER PUBLICATIONS

Paul Miller, "What is Edge Computing?" https://www.theverge.com/circuitbreaker/2018/5/7/17327584/edge-computing-cloud-google, May 7, 2018.

"What is Edge Computing," http://www.ge.com/digital/blog/what-edge-computing, GE Digital, Retrieved on May 16, 2019.

* cited by examiner

ADAPTIVE EDGE-SHIFT FOR ENTERPRISE CONTINGENCY OPERATIONS

BACKGROUND

Enterprises that use large information networks and data stores typically delegate data and analytics to cloud resources. Economics favor minimizing data and analytical resources at edge nodes. However, information networks whose edge nodes are geographically fixed may need to have access to the data and analytics even when performance of such a network is compromised or rendered inoperable.

Therefore, it would be desirable to provide apparatus and methods for maintaining service during a communication network outage.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
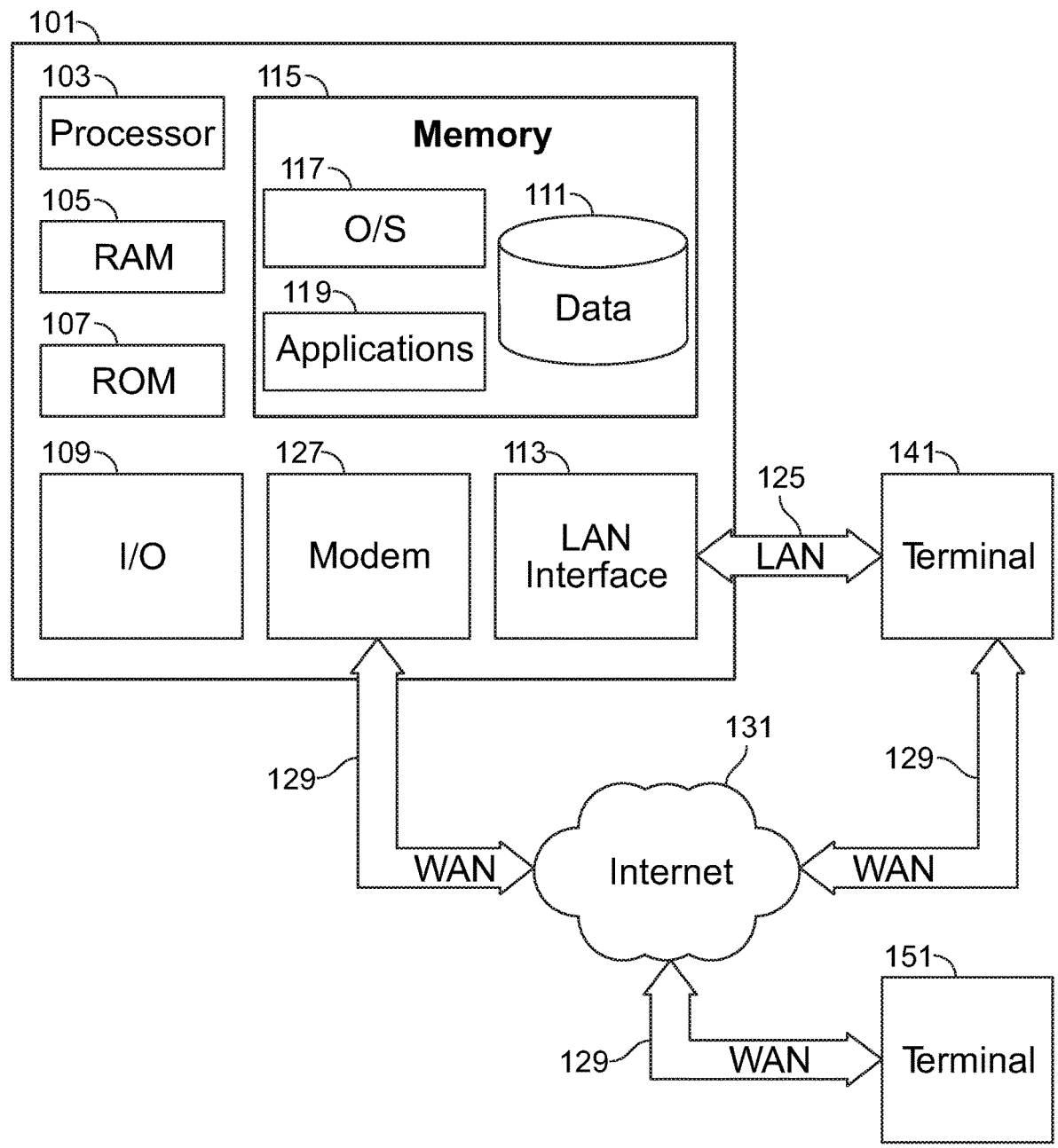
FIG. 1 shows illustrative apparatus that may be used in accordance with principles of the invention.

Apparatus and methods for maintaining service during a communication network outage are provided.

The communication network may include a WAN. The WAN may be geographically distributed to provide backbone data communication services between a logically or geographically central enterprise data store, an enterprise core application server farm, and an edge node that provides services to, and exchange information with, enterprise customers. The edge node may be one of a plurality of edge nodes on the WAN that provide services to, and exchange information with, enterprise customers.

The apparatus may include an outage monitor. The outage monitor may monitor conditions that may affect the performance or integrity of the WAN. Table 1 lists illustrative conditions.

TABLE 1

Illustrative conditions.
Illustrative conditions
($f_i$ are likelihood functions for occurrence of condition i; $\xi$ indicates a geographic location)

| Information Channel Monitoring | Enterprise WAN Probe |
|---|---|
| Weather $f_1(\xi)$ | Cyber threat $f_8(\xi)$ |
| Fire $f_2(\xi)$ | Communication system (wan, internet, satellite comms, cellular phone system, pots) instability $f_9(\xi)$ |
| Social unrest $f_3(\xi)$ | Other suitable conditions |
| National security $f_4(\xi)$ | |
| Cyber threat $f_4(\xi)$ | |
| Power grid instability $f_5(\xi)$ | |
| Communication system (internet, satellite comms, cellular phone system, pots) instability $f_6(\xi)$ | |
| Other suitable conditions | |

The monitor may crawl news and information sources to identify conditions at locations $\xi$. The monitor may use the conditions to predict the likelihood of a condition in a region X that includes some of the $\xi$, along with some edgenodes B. For each X, the monitor may generate a likelihood of each condition (an "imminence"). For each X, the monitor may generate a likelihood of a duration of the condition (a "permanence").

The apparatus may include a controller. The controller may act on information or instructions generated by the monitor to update information at edge nodes. The controller may control access of an edge node. The controller may be in communication with the monitor. The controller may be in communication via an enterprise WAN with the monitor. The controller may be in communication via an enterprise WAN with a digital switch at an edge location. The digital switch may be configured to switch, responsive to a state variable in the monitor, between: a regular-operations information machine; and a contingency server disposed at the edge location. When the switch engages the contingency server, data on the contingency server may be available to one or more of banking associates, call center attendants, customers and other suitable enterprise personnel and systems.

The outage monitor may be disposed, logically, centrally with respect to the WAN. The controller may be disposed, logically, centrally with respect to the WAN. The outage monitor may be distributed, logically, with respect to the WAN. The controller may be distributed, logically, with respect to the WAN.

The digital switch may be disposed, logically, between: (a) the enterprise WAN; and (b) the regular-operations information machine and the contingency server. The digital switch may be configured to activate an electronic-communication firewall that is logically disposed between the switch and the enterprise WAN. When the switch engages the contingency server and institutes the firewall, data on the contingency server may be unavailable to one or more of banking associates, call center attendants, customers and other suitable enterprise personnel and systems.

The monitor may be configured to determine an outage imminence. The monitor may be configured to determine an outage permanence. The monitor may be configured to determine an edge-weight that corresponds to the extent to which information and applications are deployed to edge nodes in response to a condition. The edge weight may define a magnitude of a contingency roll-out.

The apparatus may include a data layer mapping engine that is configured to identify data elements corresponding to the edge-weight.

The data layer mapping engine may store relationships between data elements and different edge-weights. Table 2 lists illustrative data categories.

TABLE 2

| Illustrative Data Categories |
| --- |
| Illustrative Data Categories |
| Debit card transaction records |
| Credit card transaction records |
| On-line banking records |
| Mortgage account records |
| Automobile loan account records |
| Brokerage account records |
| Customer contact records |
| Customer Profile Information |
| Other suitable conditions |

A content element may be mapped ("X," in the Tables below) to one or more edge weights. In the tables, "Trans." means "transaction."

Table 3 shows illustrative mapping between debit car records and edge weights.

TABLE 3

Illustrative mapping between debit card records and edge weights.
Debit Card Record Mapping

| Edge-Weight | Trans. ID | Merchant ID | Merchant Location | Trans. Date | Trans. Time | Purchase Amount | Items Purchased | Trans. Instrument |
| --- | --- | --- | --- | --- | --- | --- | --- | --- |
| High | X | X | X | X | X | X | X | X |
| Medium | X | X |  | X |  | X |  | X |
| Low | X |  |  | X |  | X |  |  |

"Transaction instrument" may identify a card that was used to perform a transaction.

Table 4 shows illustrative mapping between credit car records and edge weights.

TABLE 4

Illustrative mapping between credit card records and edge weights.
Credit Card Record Mapping

| Edge-Weight | Trans. ID | Merchant ID | Merchant Location | Trans. Date | Trans. Time | Purchase Amount | Items Purchased | Trans. Instrument |
| --- | --- | --- | --- | --- | --- | --- | --- | --- |
| High | X | X | X | X | X | X | X | X |
| Medium | X | X |  | X |  | X |  | X |
| Low | X |  |  | X |  | X |  |  |

Table 5 shows illustrative mapping between on-line banking records and edge weights.

TABLE 5

Illustrative mapping between on-line banking records and edge weights.
On-line banking record mapping

| Edge-Weight | Trans. ID | Acc't No. | Trans. Date | Trans. Time | Trans. Amount | Trans. Type (Dep/Check/ ACH/Transfer) | Payee | Items Purchased | Memo |
| --- | --- | --- | --- | --- | --- | --- | --- | --- | --- |
| High | X | X | X | X | X | X | X | X | X |
| Medium | X | X | X |  | X | X | X | X |  |
| Low | X | X | X |  | X |  | X |  |  |

Table 6 shows illustrative mapping between mortgage account records and edge weights.

TABLE 6

Illustrative mapping between mortgage account records and edge weights.
On-line mortgage account record mapping

| Edge-Weight | Trans. ID | Loan No. | Trans. Date | Trans. Amount | Principal | Interest | Accrued Interest | Balance | Memo |
|---|---|---|---|---|---|---|---|---|---|
| High | X | X | X | X | X | X | X | X | X |
| Medium | X | X | X | X | X | X | X | X | |
| Low | X | X | X | X | | | X | X | |

Table 7 shows illustrative mapping between automobile loan account records and edge weights.

TABLE 7

Illustrative mapping between automobile loan account records and edge weights.
Automobile loan account record mapping

| Edge-Weight | Trans. ID | Loan No. | Trans. Date | Trans. Amount | Principal | Interest | Accrued Interest | Balance | Memo |
|---|---|---|---|---|---|---|---|---|---|
| High | X | X | X | X | X | X | X | X | X |
| Medium | X | X | X | X | X | X | X | X | |
| Low | X | X | X | X | | | X | X | |

Table 8 shows illustrative mapping between brokerage account records and edge weights.

TABLE 8

Illustrative mapping between brokerage account records and edge weights.
Brokerage account record mapping

| Edge-Weight | Trans. ID | Trans. Date | Account ID | Title | Buy/Sell | Quantity | Amount | Currency | Account balance | Status (pending/confirmed) |
|---|---|---|---|---|---|---|---|---|---|---|
| High | X | X | X | X | X | X | X | X | X | X |
| Medium | X | X | X | | X | | X | X | X | X |
| Low | X | X | X | | X | | X | | X | |

Table 9 shows illustrative mapping between customer profile records and edge weights.

TABLE 9

Illustrative mapping between customer profile records and edge weights.
Customer profile record mapping

| Edge-Weight | Unique Customer ID | Account listing | Home banking center | Personal banking associate ID | New product offer history | New product acquisition history | In-person banking center visit history | Net wealth category | Preferred contact channel |
|---|---|---|---|---|---|---|---|---|---|
| High | X | X | X | X | X | X | X | X | X |
| Medium | X | | X | X | X | | X | X | X |
| Low | X | | X | X | | | | X | X |

The data layer mapping engine may include look-back windows for the different edge weights, for each of the data element categories. The look-back windows may differ for the different banking centers. Longer look-back windows may include more historical data. Shorter look-back windows may include less historical data. The look-back windows may be expressed in terms of one or more of days, weeks, months and years.

The apparatus may include an application layer mapping engine that is configured to identify application elements corresponding to the edge-weight.

Table 10 shows illustrative mapping between edge node (banking center) application updates and edge weights.

TABLE 10

Illustrative mapping between customer profile records and edge weights.
Application Layer Mapping (version no.)

| Edge-Weight (current version no.) | Banking Center 1 | Banking Center 2 | Banking Center 3 | Banking Center 4 | Banking Center 5 | Banking Center 6 |
|---|---|---|---|---|---|---|
| High (6) | 6 | 6 | 6 | 6 | 6 | 5 |
| Medium (12) | 12 | 11 | 11 | 11 | 11 | 11 |
| Low (9) | 9 | 9 | 9 | 9 | 8 | 8 |

The high edge weight application layer may be identical to the regular operations application layer in the regular operations server.

The apparatus may include an application layer mapping engine that is configured to identify application elements corresponding to the edge-weight.

Apparatus and methods for rolling out contingency information from a central facility to an edge location are provided. The methods may include querying a monitor for an edge-weight corresponding to a location. The methods may include acquiring from the monitor a binary deploy instruction. The methods may include providing the location to the monitor.

The methods may include mapping the edge-weight to a data-layer package.

The methods may include, responsive to the deploy instruction, transmitting to an edge contingency server the data-layer package.

The methods may include mapping the edge-weight to an application-layer package.

The methods may include, responsive to the deploy instruction, transmitting to an edge contingency server the application-layer package.

The methods may include, responsive to the deploy instruction, transmitting a firewall-enable instruction to a firewall upstream of the edge contingency server and a regular operations information machine.

The methods may include, at the edge location, discovering a communication network condition. The methods may include, in response to the condition, enabling a firewall that is logically disposed: upstream of the edge contingency server and a regular operations information machine; and downstream of an enterprise WAN of which the edge location is a node.

The methods may include, using the monitor, determining for the location an imminence. The methods may include, using the monitor, determining for the location a permanence.

The methods may include, using the monitor, identifying the greatest edge-weight that: corresponds to the permanence; and does not exceed the imminence.

The methods may include receiving a binary deploy instruction from the monitor; and, responsive to the deploy instruction, transmitting to an edge contingency server the data-layer package that corresponds to the edge-weight.

The methods may include, responsive to the deploy instruction, transmitting to the edge contingency server the application-layer package that corresponds to the edge-weight.

The apparatus and methods may include methods for rebuilding content of an enterprise core data store.

The methods may include determining that a WAN that connects an edge node with the data store satisfies a performance condition; and an integrity condition. The methods may include receiving a first outage pointer from the data store. The methods may include recovering from the edge node a second outage pointer from an operations server. The methods may include recovering from a contingency server at the edge node a switch-ON pointer. The methods may include recovering from a contingency server at the edge node a switch-OFF pointer. The methods may include copying from the edge node to the data store any data: (a) in the operations server between the first outage pointer and the second outage pointer; and, then, (b) in the contingency server that is: between the switch-ON pointer and the switch-OFF pointer; and not duplicative of data included in (a).

The methods may include providing to the edge node, via the WAN, a security key configured to change the switch from ON to OFF.

Illustrative embodiments of apparatus and methods in accordance with the principles of the invention will now be described with reference to the accompanying drawings, which forma part hereof. It is to be understood that other embodiments maybe utilized and that structural, functional and procedural modifications or omissions may be made without departing from the scope and spirit of the present invention.

For the sake of illustration, the steps of the illustrated processes will be described as being performed by a "system." The "system" may include one or more of the features of the apparatus that are shown in FIGS. 1-7 and/or any other suitable device or approach. The "system" may include one or more means for performing one or more of the steps described herein.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 17 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to compute imminence, permanence, edge weights, and mapping, and to formulate deploy-instructions, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
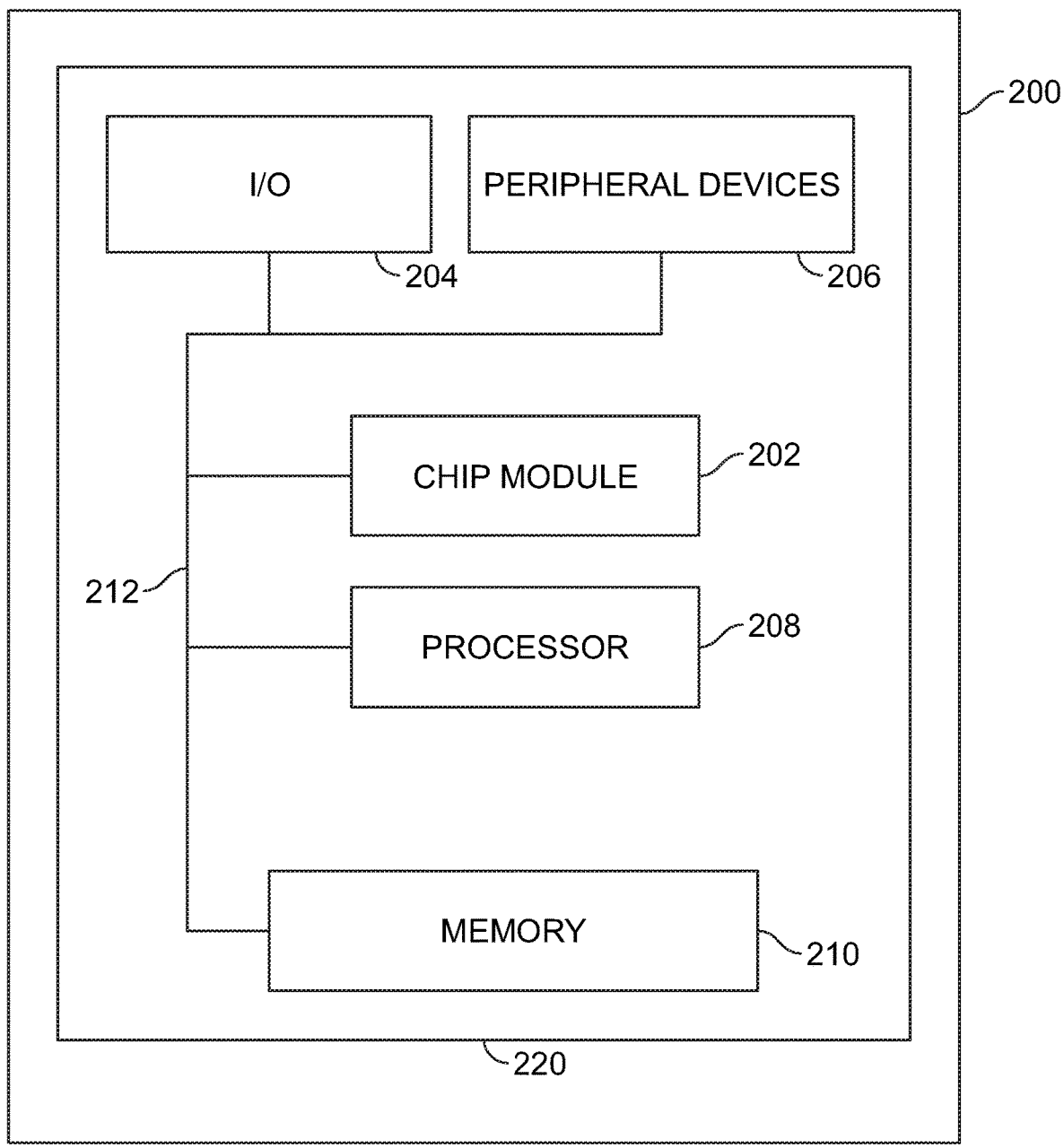
FIG. 2 shows illustrative apparatus that may be used in accordance with principles of the invention.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute imminence, permanence, edge weights, mapping, and perform other methods described herein; and machine-readable memory 210.

Machine-readable memory 210 may be configured to store in machine-readable data structures: imminence, permanence, edge weights, mappings, deploy-instructions and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

FIGS. 3-7 show illustrative arrangements that may include one or more of the features show in or described in connection with FIGS. 1 and 2.

Figure 3:
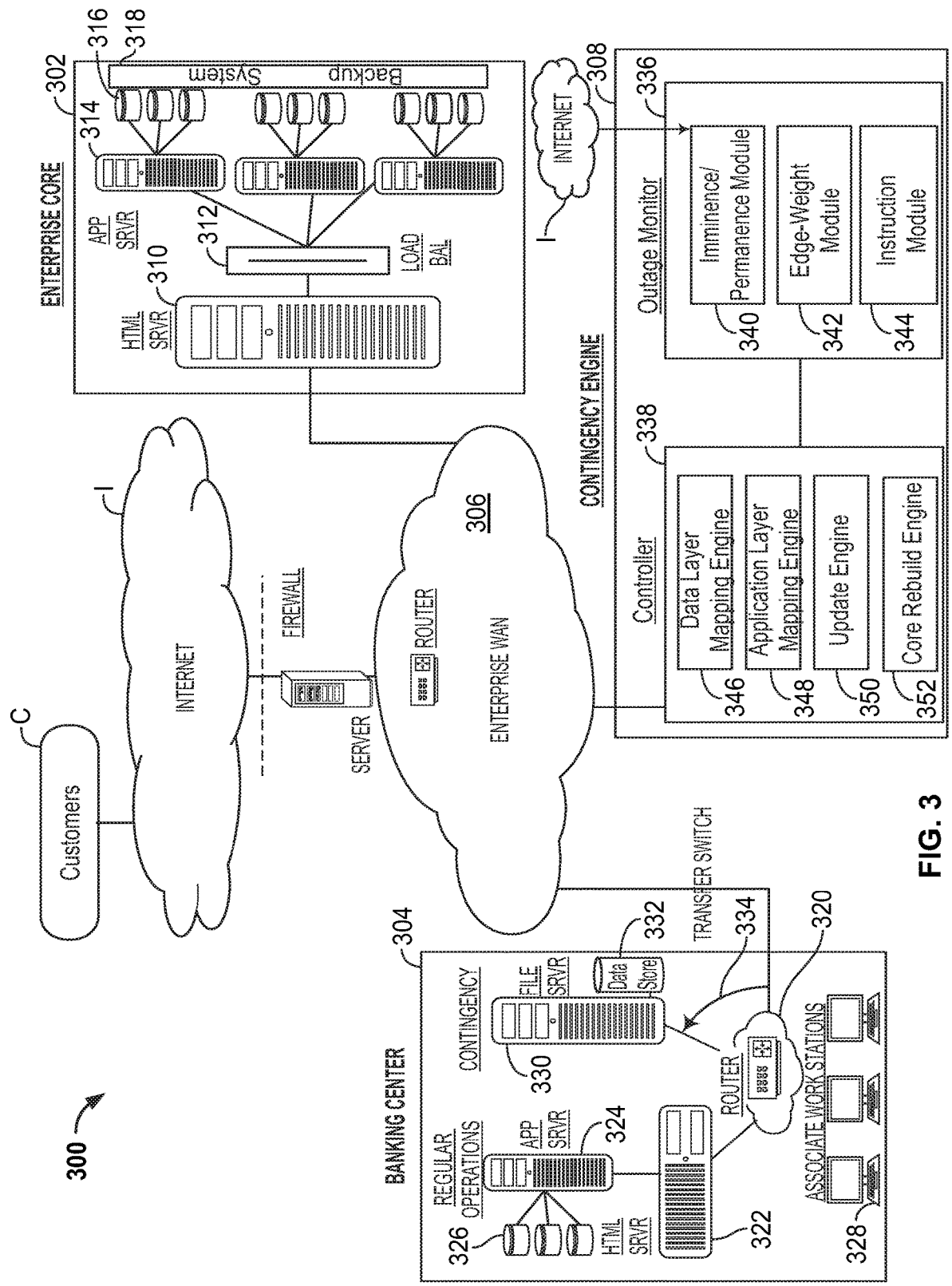
FIG. 3 shows illustrative apparatus in accordance with principles of the invention.

FIG. 3 shows illustrative arrangement 300 for providing services. Arrangement 300 may include enterprise core 302. Arrangement 300 may include banking center 304. Arrangement 300 may include enterprise wide area network ("WAN") 306. Arrangement 300 may include contingency engine 308. Customers C may exchange information with one or both of core 302 and banking center 304 via internet I. Internet I may be in electronic communication with WAN 306.

Enterprise core 302 may provide information services to one or more banking centers such as 304. Enterprise core 302 may provide information services to one or more of customers C. Enterprise core 302 may include HTML server 310. Enterprise core 302 may include load balancer 312. Enterprise core may include one or more of application servers 314. Enterprise core may include one or more of data stores 316. Enterprise core 302 may include data and application backup system 318.

Banking center 304 may be an edge node with respect to WAN 306. Banking center 304 may be one of a plurality of such banking centers. Banking center 304 may include router 320. Banking center 304 may include HTML server 322. Banking center 304 may include regular-operations information machine 324. Regular-operations information machine 324 may include an application server. Banking center 304 may include data stores 326. Banking center 304 may include associate workstations 328. Banking center 304 may include contingency server 330. Contingency server 330 may include a file server. contingency server 330 may include an application server. Banking center 304 may include data store 332. Banking center 304 may include transfer switch 334. Transfer switch 334 may include a switch function. Transfer switch may include a firewall function.

Contingency engine 308 may include outage monitor 336. Contingency engine 308 may include controller 338.

Outage monitor 336 may include imminence/permanence module 340. Outage monitor 336 may include edge-weight module 342. Outage monitor 336 may include instruction module 344.

Controller 338 may include data layer mapping engine 346. Controller 338 may include application layer mapping engine 348. Controller 338 may include update engine 350. Controller 338 may include core rebuild engine 352.

Figure 4:
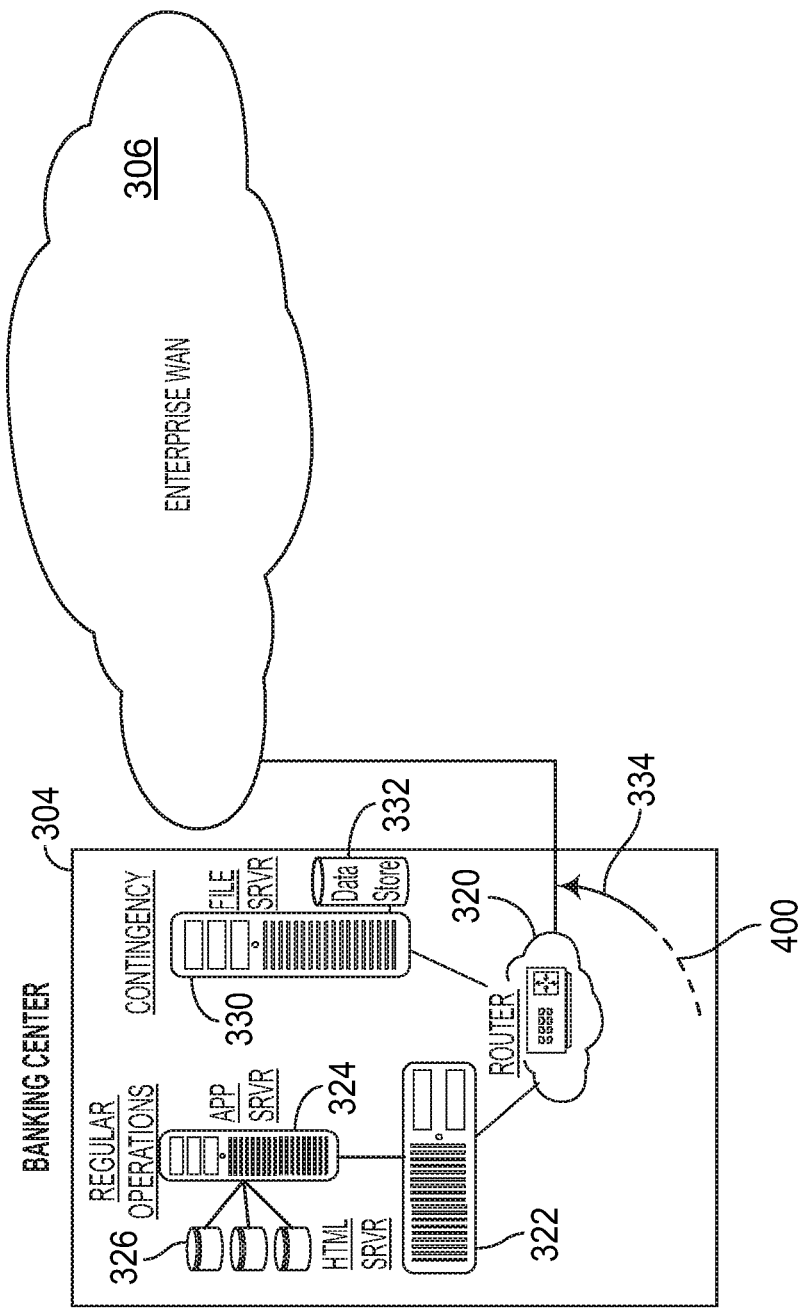
FIG. 4 shows illustrative apparatus in accordance with principles of the invention.

FIG. 4 shows arrangement 300, in part, in a configuration in which transfer switch 334 is open with respect to WAN 306, regular-operations information machine 324 and contingency server 330. Firewall function 400 is not deployed.

Figure 5:
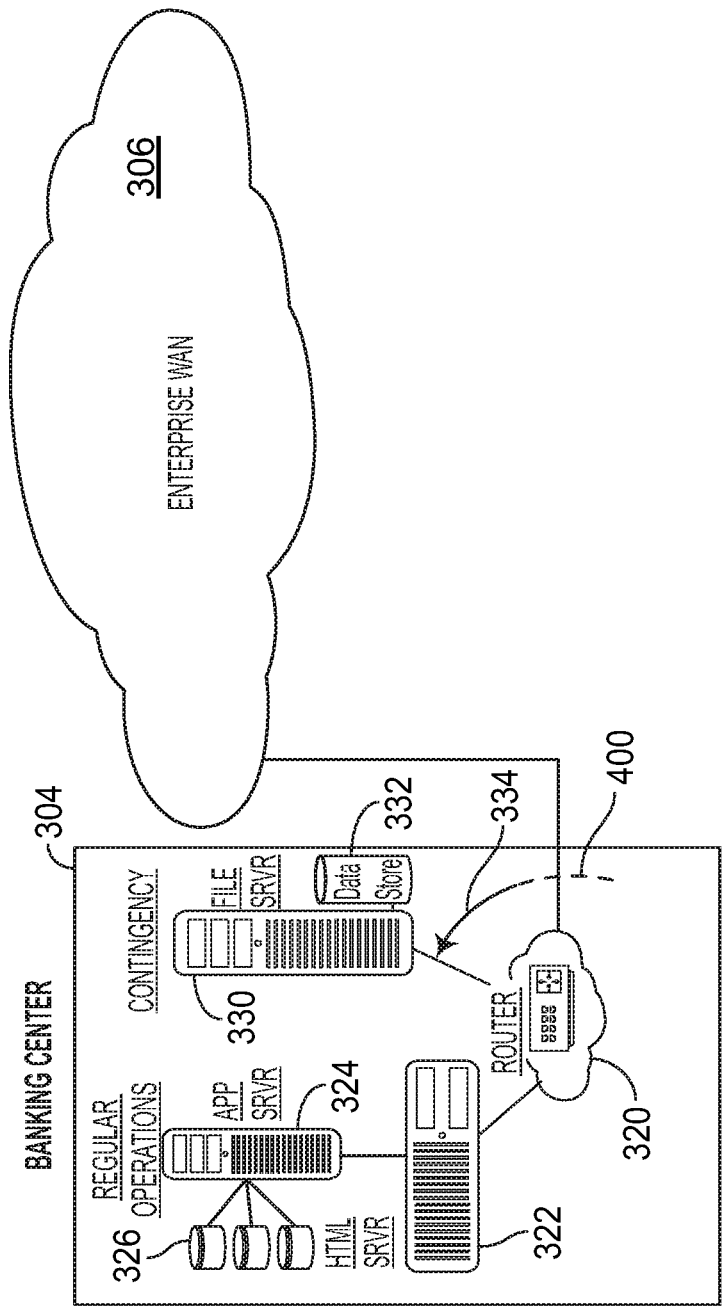
FIG. 5 shows illustrative apparatus in accordance with principles of the invention.

FIG. 5 shows arrangement 300, in part, in a configuration in which transfer switch 334 is closed (on the "upstream" side) with respect to WAN 306 and closed (on the "downstream" side) with respect to regular-operations information machine 324 and contingency server 330. Firewall function 400 is deployed. Firewall 400 may be deployed in addition to the closure of transfer switch 334. The deployment of firewall 400 may be the closure itself of transfer switch 334.

Figure 6:
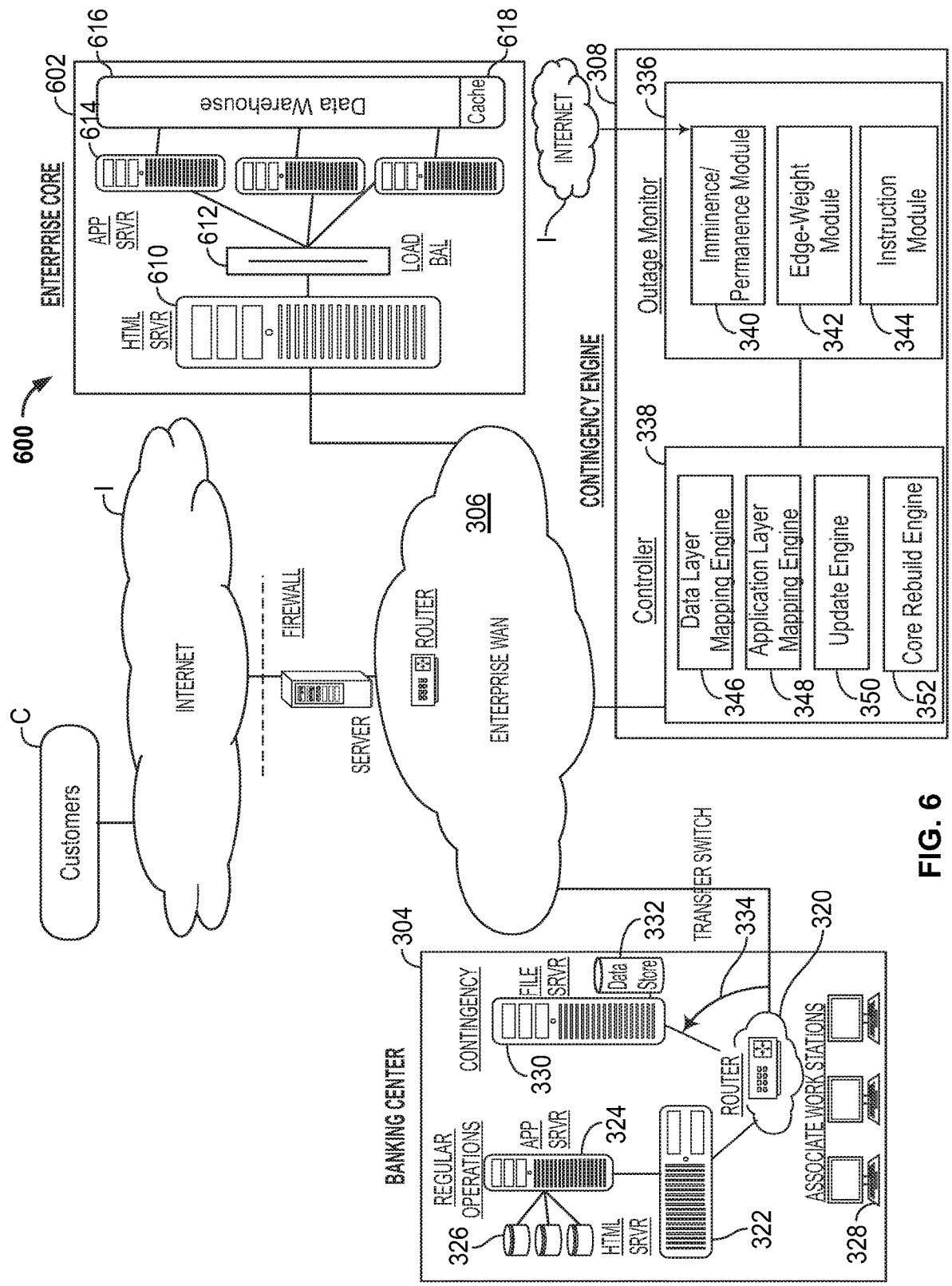
FIG. 6 shows illustrative apparatus in accordance with principles of the invention.

FIG. 6 shows illustrative arrangement 600 for providing services. Arrangement 600 may include enterprise core 602.

Customers C may exchange information with one or both of core 602 and banking center 304 via internet I. Internet I may be in electronic communication with WAN 306.

Enterprise core 602 may provide information services to one or more banking centers such as 304. Enterprise core 602 may provide information services to one or more of customers C. Enterprise core 602 may include HTML server 610. Enterprise core 602 may include load balancer 612. Enterprise core may include one or more of application servers 614. Enterprise core may include data warehouse 616. Data warehouse 616 may include a centralized data store for nodes on WAN 306. Data warehouse 616 may be a commercially available data warehouse such as that available under the tradename "MERLIN." Enterprise core 602 may include data cache 618. Data cache 618 may back up data from data warehouse 616.

Figure 7:
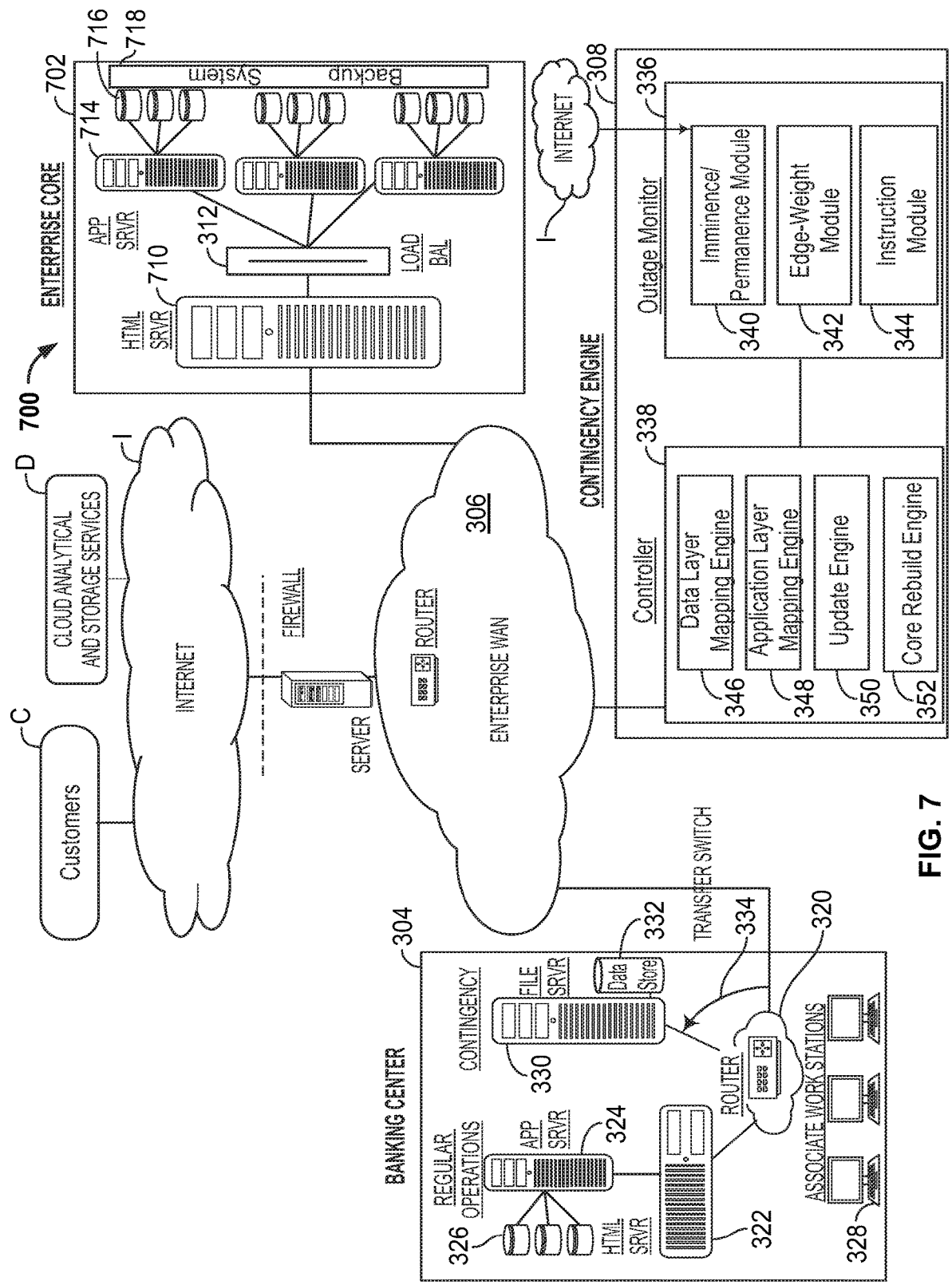
FIG. 7 shows illustrative apparatus in accordance with principles of the invention.

FIG. 7 shows illustrative arrangement 700 for providing services. Arrangement 700 may include enterprise core 702.

Customers C may exchange information with one or both of core 702 and banking center 304 via internet I. Internet I may be in electronic communication with WAN 306.

Enterprise core 702 may provide information services to one or more banking centers such as 304. Enterprise core 702 may provide information services to one or more of customers C. Enterprise core 702 may include HTML server 710. Enterprise core 702 may include one or more application server 714. Enterprise core 702 may have fewer application servers than do enterprise cores 302 or 602 (shown in FIGS. 3 and 6, respectively), because analytical functions in arrangement 700 may have been implemented in cloud analytical and storage services D. Enterprise core 702 may include one or more of data stores 716. Enterprise core 702 may include data and application backup system 718. Enterprise core 702 may have fewer data stores than do enterprise cores 302 or 602 (shown in FIGS. 3 and 6, respectively), because data storage in arrangement 700 may have been implemented in cloud analytical and storage services D. Enterprise core 702 may have fewer data back-up resources than do enterprise cores 302 or 602 (shown in FIGS. 3 and 6, respectively), because data back-up resources in arrangement 700 may have been implemented in, or via, cloud analytical and storage services D.

Figure 8:
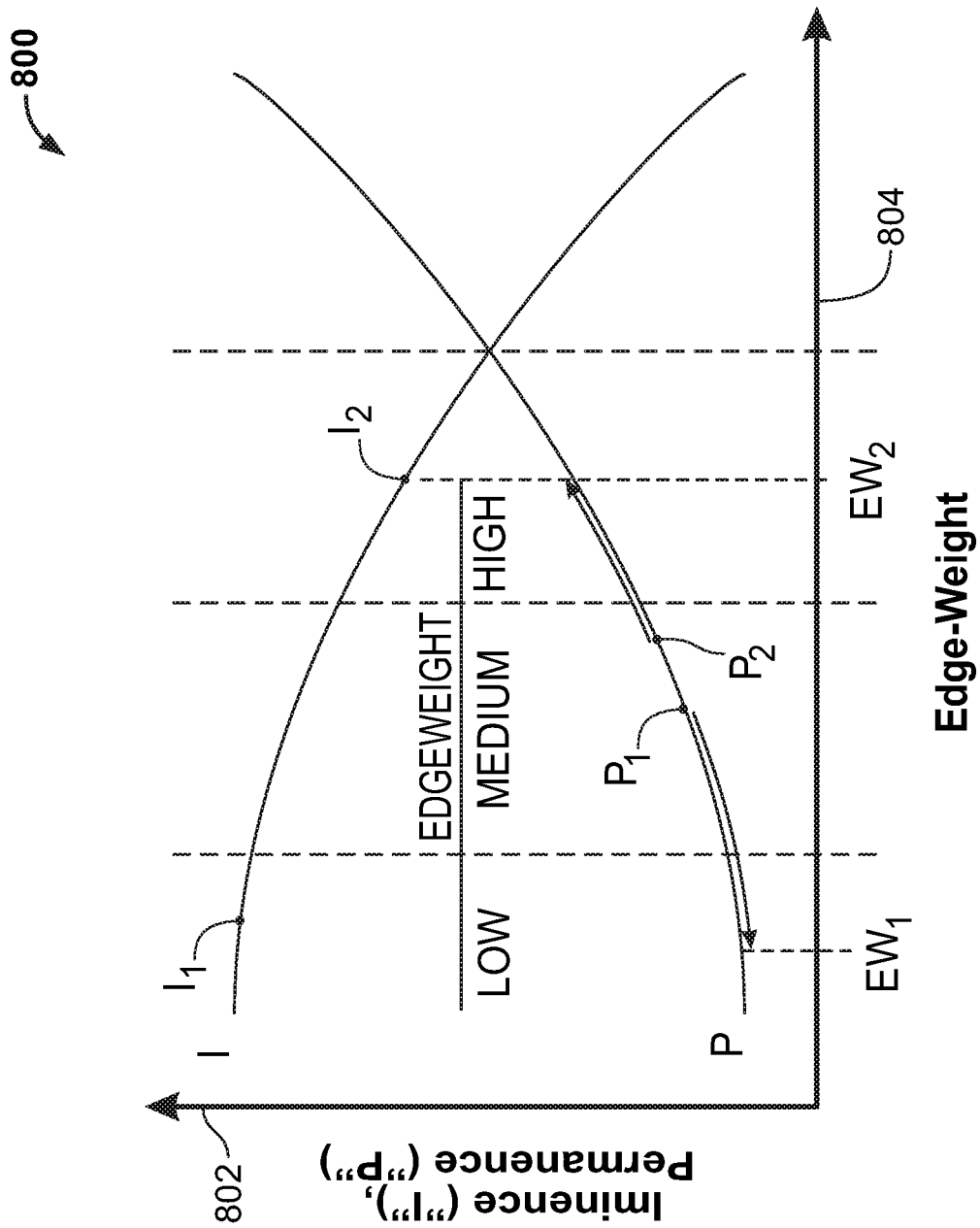
FIG. 8 shows illustrative information in accordance with principles of the invention.

FIG. 8 shows illustrative relationship 800 between imminence ("I"), permanence ("P") and edge weight ("LOW," "MEDIUM," "HIGH"). Axis 802 increases with increasing I and P. Axis 804 increases with increasing edge weight. As I increases, transmission bandwidth (integrated over available time) decreases. This forces edge weight down. As P increases, the need for more transfer to the edge increases. This forces edge weight up.

The following Scenarios are hypothetical examples of finding an edge weight.

Scenario I.

Imminence is forecast to be $I_1$. Permanence is forecast to be $P_1$. The system may be set to prioritize imminence over permanence, so the edge weight is defined by $I_1$.

Scenario II.

Imminence is forecast to be $I_2$. Permanence is forecast to be $P_2$. The system may be set to prioritize imminence over permanence, so the edge weight is defined by $I_2$.

In some embodiments, the system may first calculate for each edge node a payload size for each edge weight. The system may then forecast I, which gives a time window in which the payload may be moved to the edge. The system may then determine which edge weight to apply.

Figure 9:
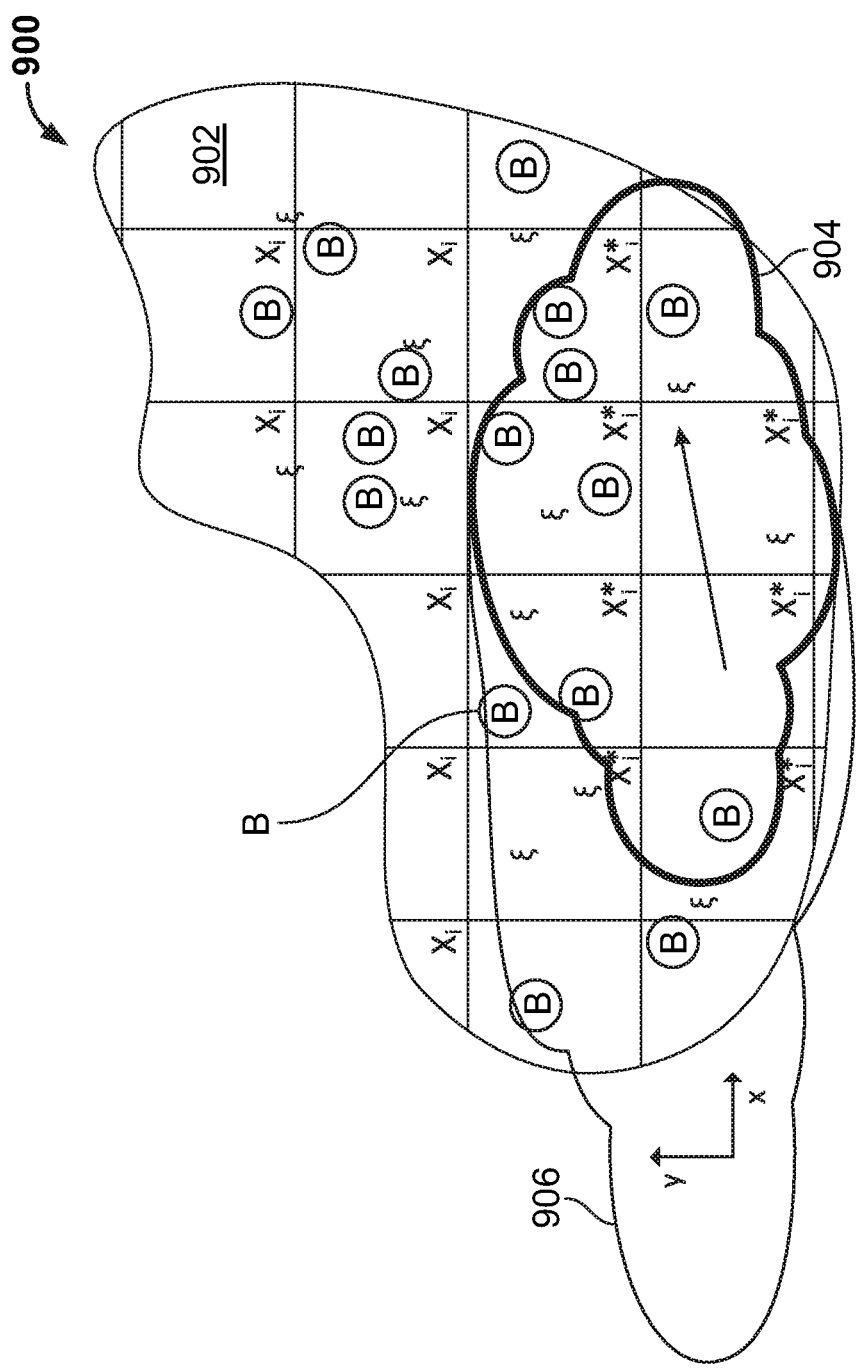
FIG. 9 shows illustrative information in accordance with principles of the invention.

FIG. 9 shows schematic outage model 900. Model 900 may include geographic grid 902. Each cell $X_i$ may represent a region. Banking centers B (circled) are plotted in their locations on grid 902. Data from conditions in the geographic area of the grid may be measured, observed, or reported from, or associated with, discrete geographic locations ξi. A forecasted outage region 904 may be mapped onto grid 902. Cells $X_i$ that are touched by outage region 904 may be designated as $X_i^*$. Any banking center B in a cell $X_i^*$ may be designated has having an imminence based on the time at which the corresponding $X_i^*$ is forecast to be touched by outage region 904. Banking centers such as banking center B may be outside outage region 904, but may still be designated as having an imminence by virtue of banking center B's disposition in an $X_i^*$. Vector V is proportional to speed of centroid of region 904, and shows average direction of travel of region 904. Tail 906 of region 904 covers a region for which region 904 has past, but for which outages are forecast to remain in the aftermath of the condition. Tail 906 may be used as a basis for permanence.

Figure 10:
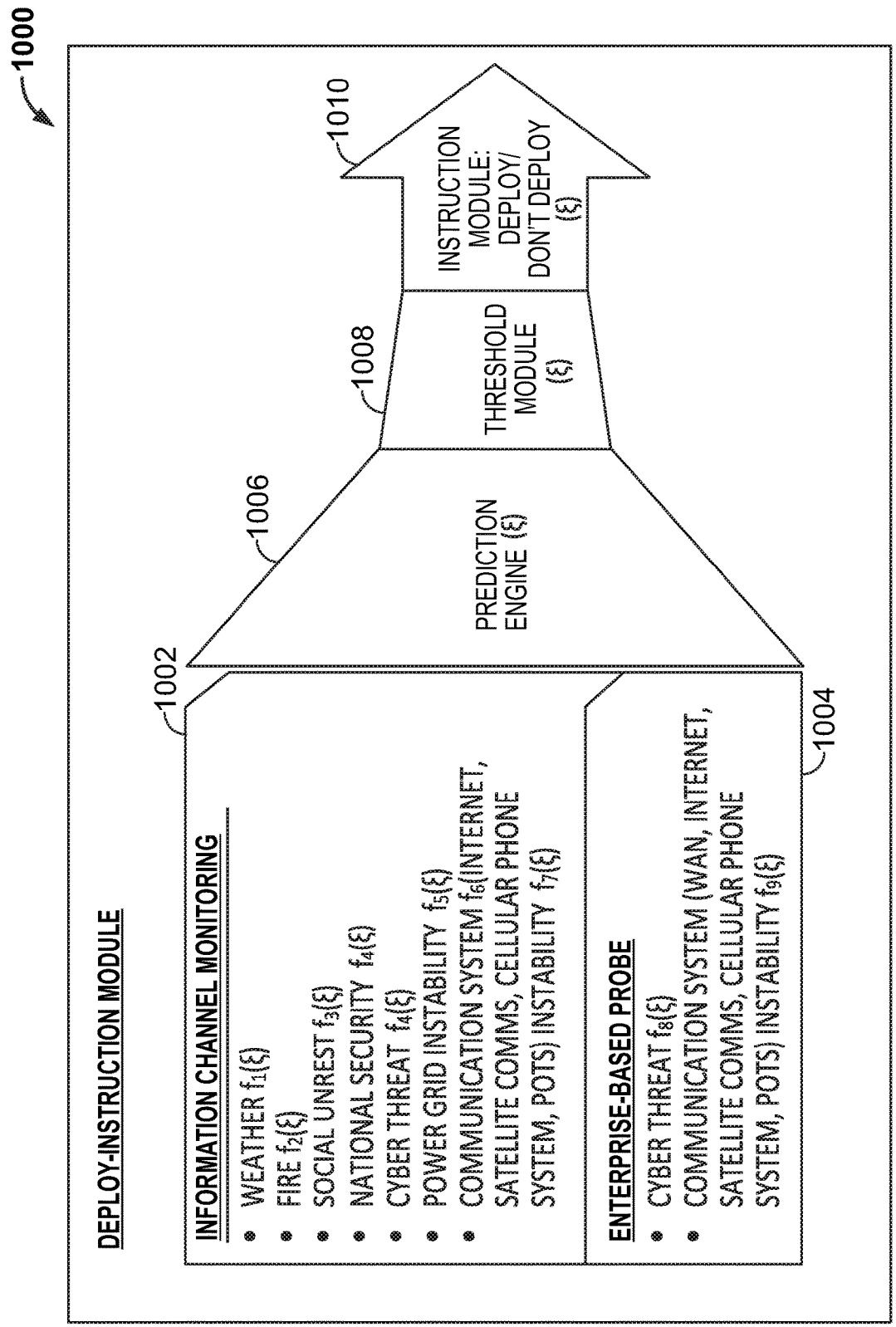
FIG. 10 shows an illustrative process in accordance with principles of the invention.

FIG. 10 shows illustrative logic flow 1000 for a deploy-instruction module. Logic flow 1000 may include information channel monitoring 1002. Logic flow 1000 may include enterprise-based probe 1004. Logic flow 1000 may include prediction engine 1006. Logic flow 1000 may include threshold 1008. Logic flow 1000 may generate binary instruction 1010.

Information channel monitoring 1002 may include monitoring conditions such as those listed in Table 1.

Enterprise-based probe 1004 may include monitoring conditions such as those listed in Table 1.

Prediction engine 1006 may execute one or more algorithms to assign probabilities to the conditions tracked by information channel monitoring 1002 and enterprise-based probe 1004.

Threshold module 1008 may determine whether the probability of occurrence of a condition is above a threshold. The threshold may be predetermined.

Instruction module 1010 may provide an instruction. The instruction may be "DEPLOY" data to the edge node. The instruction may be "DO NOT DEPLOY" data to the edge node. The "DO NOT DEPLOY" instruction may be an instruction that does not interrupt regular updates and communications to regular operations server 324. The "DO NOT DEPLOY" instruction may be an instruction that does not interrupt regular updates and communications to contingency server 330.

The imminence may be the time period between the present and the future time at which a probability of a condition exceeds the threshold.

Prediction engine 1006 may include modules for applying predictive algorithms to the inputs from information channel monitoring 1002 and enterprise-based probe 1004. The predictive algorithms may include neural net algorithms, multivariate statistical algorithms, random variable-based algorithms, and other suitable artificial intelligence algorithms.

Figure 11:
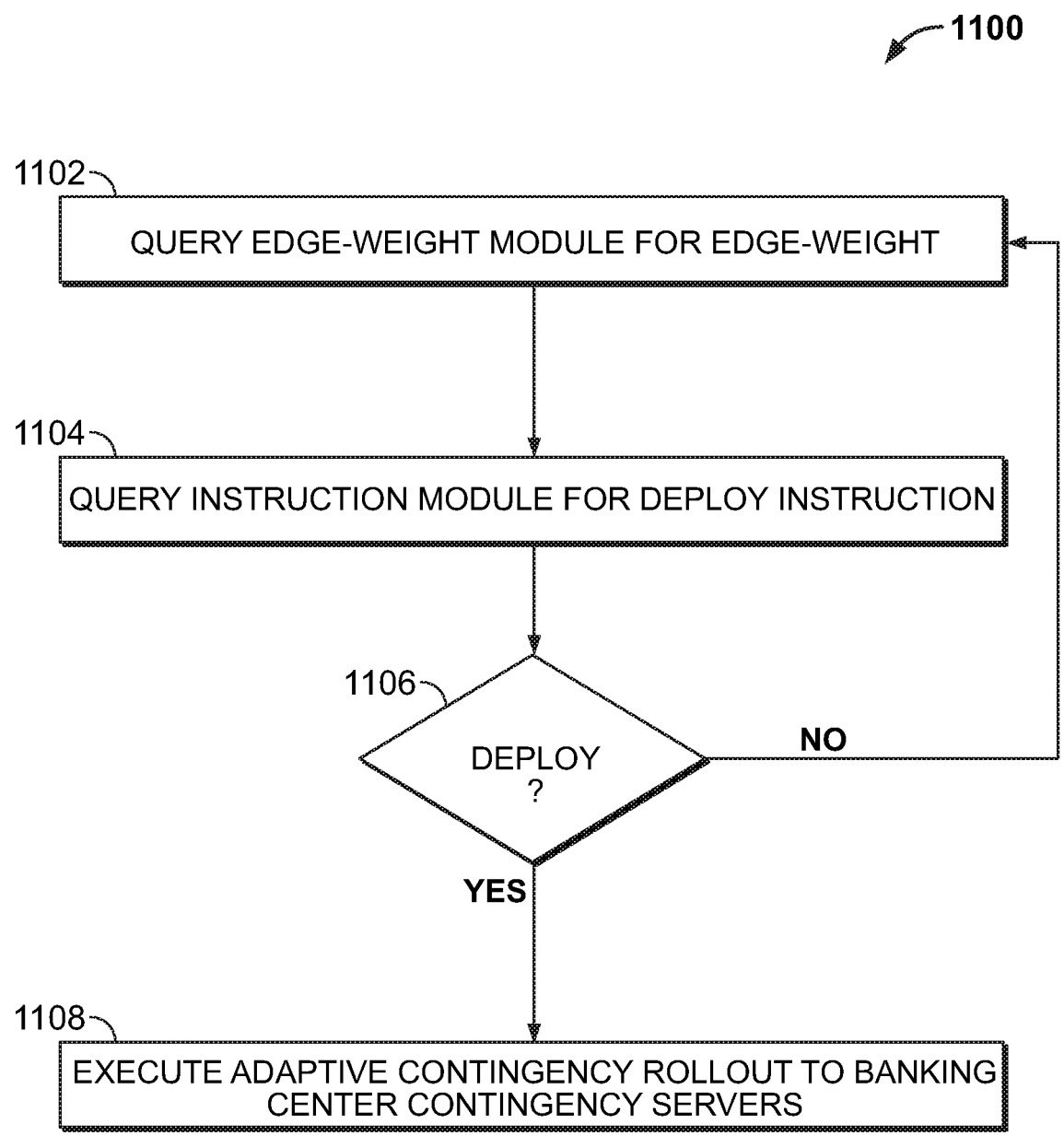
FIG. 11 shows an illustrative process in accordance with principles of the invention.

FIG. 11 shows illustrative steps of process 1100 that may be executed by an update engine such as 350 (shown in FIG. 3).

At step 1102, the system may query the edge-weight module to determine an edge-weight for each banking center. At step 1104, the system may query the instruction module for a deploy instruction. At step 1106, process 1100 may branch. If the instruction is "DO NOT DEPLOY," process 1100 may return to step 1102. Regular updates of the banking center, and information exchange between the banking center and the enterprise core, may continue unaffected by process 1100. If the instruction is "DEPLOY," process 1100 may continue at step 1108. At step 1108, the update engine may deploy to the contingency server one or more of an application layer, a data layer, a transfer switch instruction and other suitable information, each corresponding to the edge-weight for the respective banking center, as received from the edge-weight module.

Figure 12:
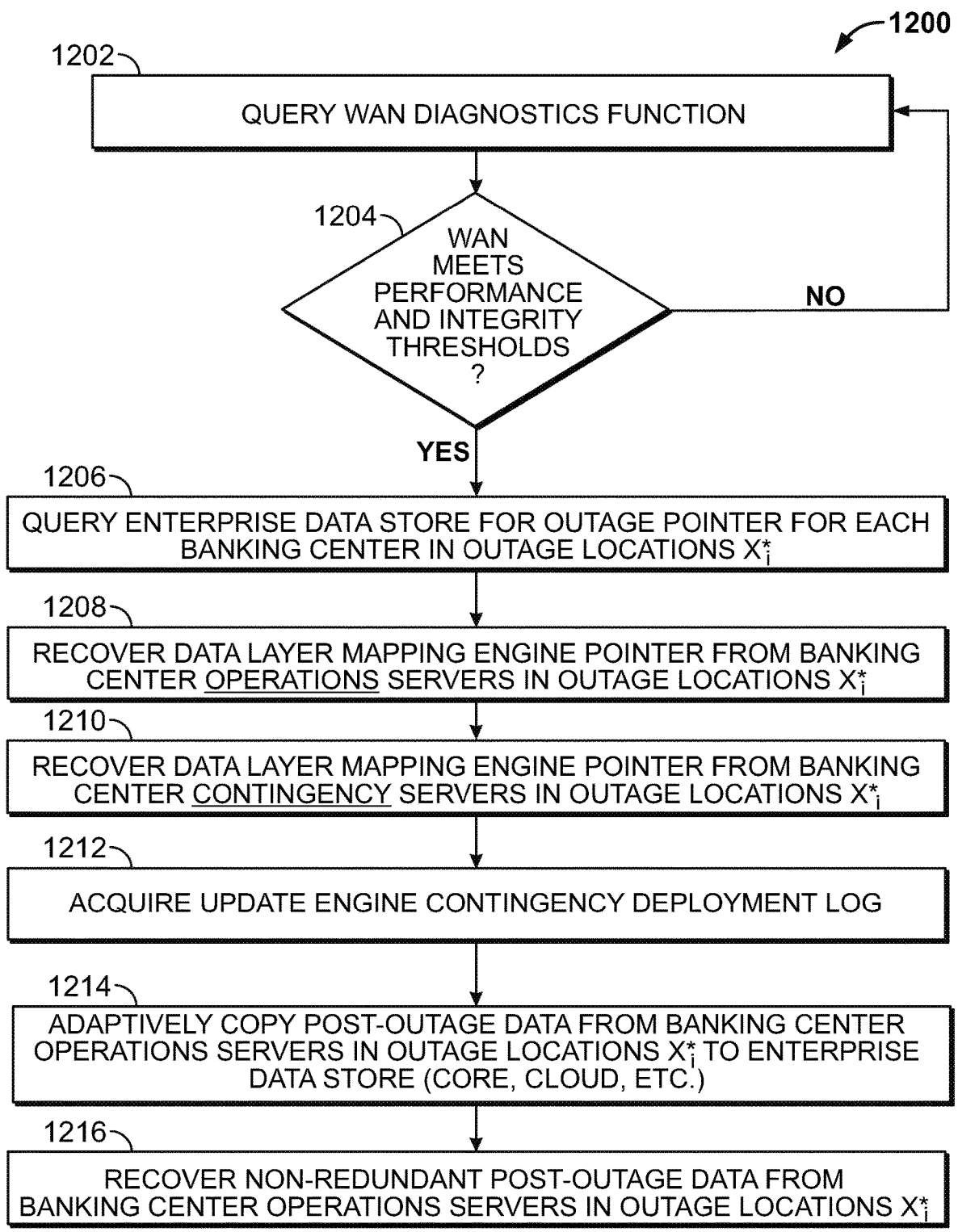
FIG. 12 shows an illustrative process in accordance with principles of the invention.

FIG. 12 shows illustrative steps of process 1200 that may be executed by a core rebuild engine such as 352 (shown in FIG. 3).

At step 1202, the system may query an enterprise WAN diagnostic function (not shown). The diagnostic function may probe the WAN to determine if the WAN is operable. The diagnostic function may probe the WAN to determine a throughput capacity, at a corresponding reliability level, of the WAN.

At step 1204, the system may determine whether, based on the probe results, the core rebuild is to proceed. If at step 1204, the system determines that the WAN does not have sufficient throughput capacity to proceed with the rebuild, the system may return to step 1202. If at step 1204, the system determines that the WAN does have sufficient throughput capacity to proceed with the rebuild, process 1200 may continue at step 1206.

At step 1206, the system may query an enterprise data store for an outage pointer for each banking center in locations $X_i^*$. The enterprise data store may include one or more data stores such as 316 (shown in FIG. 3), 614 (shown in FIG. 6) and D (shown in FIG. 7). The outage pointer may indicate the last data transmitted from the enterprise data store to the banking center.

At step 1208, the system may recover a data layer pointer from a banking center regular operations server in outage locations $X_i^*$. The data layer pointer may indicate the last data received by the regular operations server from the enterprise data store.

At step 1210, the system may recover a data layer pointer from a banking center contingency server in outage locations $X_i^*$. The data layer pointer may indicate the last data received by the contingency server from the enterprise data store.

At step 1212, the system may acquire from the update engine a contingency deployment log. The log may show for a contingency roll-out, for each banking center in locations $X_i^*$, each application layer package, and each data layer package deployed to the banking center. The system may confirm differences between the outage pointer (step 1206) and the banking center data layer pointers (steps 1208 and 1210).

At step 1214, the system may recover nonredundant post-outage data from banking center regular operations servers in outage locations $X_i^*$, and transmit it to the enterprise data store.

At step 1216, the system may recover nonredundant post-outage data from banking center contingency servers in outage locations $X_i^*$, and transmit it to the enterprise data store.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for maintaining service during a communication network outage have been provided. Persons skilled in the art will appreciate that the present invention may be practiced by other than the described embodiments, which are presented for purposes of illustration rather than of limitation. The present invention is limited only by the claims that follow.

What is claimed is:

1. Apparatus for maintaining service during a communication network outage, the apparatus comprising:
   an outage monitor;
   a controller in communication via an enterprise WAN with:
      the outage monitor; and
      a digital switch at an edge location;
   wherein the digital switch is configured to switch, responsive to a state variable in the outage monitor, between: a regular-operations information machine; and a contingency server disposed at the edge location, wherein the outage monitor is configured to determine:
      an outage imminence;
      an outage permanence; and
      an edge-weight that defines a magnitude of a contingency roll-out.

2. The apparatus of claim 1 wherein:
   the outage monitor is logically central with respect to the WAN; and
   the controller is logically central with respect to the WAN.

3. The apparatus of claim 1 wherein: the outage monitor is logically distributed with respect to the WAN; and the controller is logically distributed with respect to the WAN.

4. The apparatus of claim 1 wherein the digital switch is: logically disposed between: (a) the enterprise WAN; and (b) the regular-operations information machine and the contingency server; and further configured to activate an electronic-communication firewall that is logically disposed between the switch and the enterprise WAN.

5. The apparatus of claim 1 further comprising a data layer mapping engine that is configured to identify data elements corresponding to the edge-weight.

6. The apparatus of claim 5 further comprising an application layer mapping engine that is configured to identify application elements corresponding to the edge-weight.

7. A method for rolling out contingency information from a central facility to an edge location, the method comprising: querying a monitor for an edge-weight corresponding to a location; and acquiring from the monitor a binary deploy instruction, wherein the binary deploy instruction is based, at least in part, on:
- an outage imminence;
- an outage permanence; and
- an edge-weight that defines a magnitude of a contingency roll-out.

8. The method of claim 7 further comprising providing the location to the monitor.

9. The method of claim 7 further comprising mapping the edge-weight to a data-layer package.

10. The method of claim 9 further comprising, responsive to the deploy instruction, transmitting to an edge contingency server the data-layer package.

11. The method of claim 7 further comprising mapping the edge-weight to an application-layer package.

12. The method of claim 11 further comprising, responsive to the deploy instruction, transmitting to an edge contingency server the application-layer package.

13. The method of claim 7 further comprising, responsive to the deploy instruction, transmitting a firewall-enable instruction to a firewall upstream of the edge contingency server and a regular operations information machine.

14. The method of claim 7 further comprising:
- at the edge location, discovering a communication network condition; and,
- in response to the condition, enabling a firewall that is logically disposed: upstream of the edge contingency server and a regular operations information machine; and downstream of an enterprise WAN of which the edge location is a node.

15. The method of claim 7 further comprising:
receiving a binary deploy instruction from the monitor; and, responsive to the deploy instruction, transmitting to an edge contingency server the data-layer package that corresponds to the edge-weight.

16. The method of claim 15 further comprising, responsive to the deploy instruction, transmitting to the edge contingency server the application-layer package that corresponds to the edge-weight.

17. A method for rebuilding content of an enterprise core data store, the method comprising:
determining:
- an outage imminence;
- an outage permanence; and
- an edge-weight that defines a magnitude of a contingency roll-out;

determining that a WAN that connects an edge node with the data store satisfies a performance condition; and an integrity condition;

receiving a first outage pointer from the data store;

recovering from the edge node a second outage pointer from an operations server; recovering from a contingency server at the edge node:
- a switch-ON pointer; and
- a switch-OFF pointer; and copying, in proportion to the magnitude of the contingency roll-out, from the edge node to the data store any data:
- (a) in the operations server between the first outage pointer and the second outage pointer; and, then,
- (b) in the contingency server that is:
  - between the switch-ON pointer and the switch-OFF pointer; and
  - not duplicative of data included in (a).

18. The method of claim 17 further comprising providing to the edge node a security key configured to change the switch from ON to OFF.

* * * * *